United States Patent [19]

Gabriele et al.

[11] Patent Number: 4,746,030
[45] Date of Patent: May 24, 1988

[54] PRESSURE VESSEL INTERLOCK

[76] Inventors: Valentino Gabriele, 10109 Bird River Rd., Baltimore, Md. 21220; Donald K. Ossmus, 8630 Hoerner Ave., Baltimore, Md. 21234

[21] Appl. No.: 124,928

[22] Filed: Nov. 24, 1987

[51] Int. Cl.$^4$ .......................................... B65D 45/00
[52] U.S. Cl. ..................................... 220/316; 220/314
[58] Field of Search ................... 220/3, 315, 316, 314, 220/325

[56] References Cited

U.S. PATENT DOCUMENTS

| | | | |
|---|---|---|---|
| 3,976,218 | 8/1976 | Stoermer et al. | 220/316 |
| 4,135,640 | 1/1979 | MacQuilkin et al. | 220/316 |
| 4,325,491 | 4/1982 | Barnhill | 220/316 |
| 4,485,936 | 12/1983 | Pardo et al. | 220/316 |

*Primary Examiner*—George T. Hall
*Attorney, Agent, or Firm*—Kenneth E. Darnell

[57] ABSTRACT

A latching mechanism and pressure-operated safety lock for a pressure vessel such as a pressure frier, the invention comprises an interlock system which includes a safety lock and cooperating latching mechanism which prevents opening of the pressure vessel while potentially hazardous pressure levels exist within the vessel. The latching mechanism of the interlock system includes structure which facilitates the tightening of a lid of the pressure frier both before introduction of pressure into the vessel and during the existence of pressure conditions within the vessel. The lid is tightened over the pressure frier by means of a slotted sleeve disposed on the latching mechanism which cooperates with a pin of the safety lock to allow rotation of the latching mechanism to tighten the lid while maintaining positive engagement of the safety lock to prevent opening of the pressure vessel. The slotted sleeve of the invention acts in the manner of a ratchet in association with the pin to allow tightening of the lid or release of the lid as desired.

10 Claims, 1 Drawing Sheet

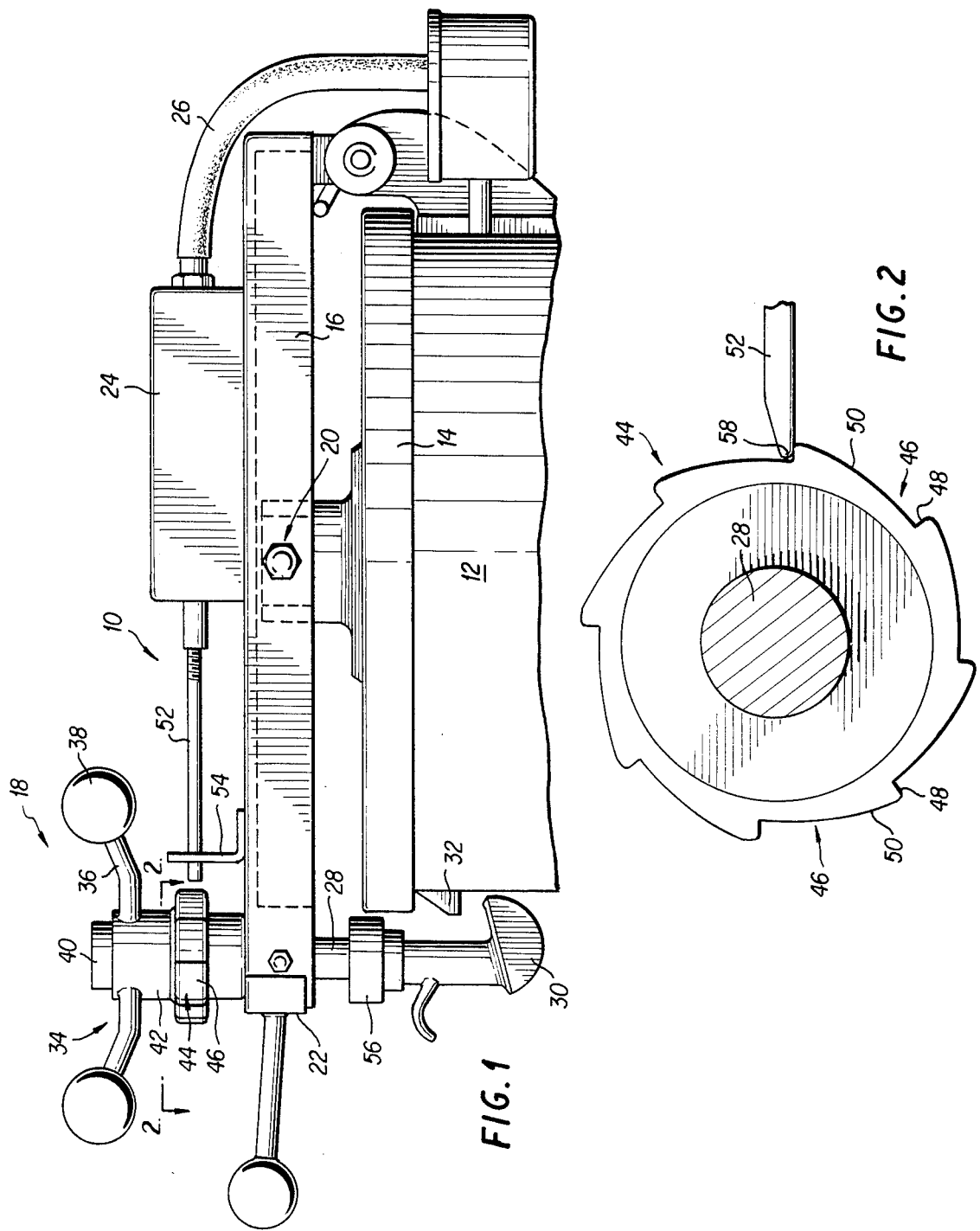

PRESSURE VESSEL INTERLOCK

CROSS-REFERENCE TO RELATED PATENTS

The present application relates to U.S. Pat. Nos. 4,485,936 and 4,498,695, the disclosures of which are incorporated hereinto by reference.

BACKGROUND OF THE INVENTION

1. Field of the Invention

The invention relates generally to safety interlock systems for pressure vessels and particularly to such systems which are operable with mechanisms for latching a lid to a pressure vessel and for preventing release of the latching mechanism while potentially hazardous pressure conditions exist within the vessel.

2. Description of the Prior Art

The prior art is described in detail in U.S. Pat. Nos. 4,485,936 and 4,498,695 issued respectively to Warren A. Pardo et al and Warren A. Pardo. Pressure vessels such as are known in the prior art invariably include a lid which allows access to the interior of a pressure vessel. Such lids must be sealed on closure of the vessel and positively latched by a mechanism which preferably allows ready opening and closure of the lid with a minimum of effort. A common environment in which pressure vessels are used relates to the cooking of foods under pressure, such devices typically being referred to as pressure cookers or pressure friers. In this use environment, it is sometimes necessary to tighten a lid on a pressure vessel in order to better seat the lid. Tightening may be necessary during a cooking cycle. Accordingly, the present invention provides a latching mechanism useful for securing a lid to a pressure vessel and which facilitates tightening of the lid to the pressure vessel.

SUMMARY OF THE INVENTION

The invention provides a latching mechanism operable in concert with a pressure-operated safety lock for a pressure vessel, particularly a pressure frier employed principally for cooking chicken or comparable foods in oil under pressure as is well known in the art. The latching mechanism of the invention is disposed at the distal or free end of a bar which extends across a lid of a cooker pot, the lid being adapted to sealingly engage upper edges of the pot. The bar is pivotally connected anteriorly to the cooker pot and is pivotally joined to the lid medially of the length of the bar and essentially centrally of the lid. An elongate spindle is mounted to the free end of the bar and has a hook element at one end thereof which is adapted to engage a catch or lug formed in the pot. Displacement of the spindle in a direction upwardly or outwardly of the lid causes the hook element to engage the catch and to force the lid over the peripheral edges of the pot opening to form a gasket provided about the perimeter thereof to form a seal through engagement with the peripheral edge portions of the pot opening. The particular structure of the invention facilitates initial tightening of the lid over the peripheral edges of the pot opening and further provides the capability of tightening the lid over the pot opening during a cooking cycle while pressure conditions exist within the pot. The structure of the invention includes a sleeve element carried on the spindle and having slots spaced regularly about the sleeve element for receiving a pin from a pressure-operated safety lock or other safety lock mounted in cooperative relation with the latching mechanism such that the pin engages one of the slots to positively lock the latching mechanism against a displacement which would allow opening of the pressure vessel while pressure conditions exist within the pot.

The slots on the sleeve element are formed with an abutment in the "closing" or "tightening" direction and have a sloping surface in the "release" direction to allow the sleeve element and pin to act in a ratchet-like manner which allows the pin of the safety lock to slide over the sloping surfaces to the next adjacent slot in order to allow tightening while preventing release of the latching mechanism due to the presence of the slot abutments.

Displacement of the spindle in the opposite direction, preferably by means of manually operated radial handles mounted to the latching mechanism within which the spindle is threadably engaged, causes the spindle to move downwardly relative to the lid and releases the hook element from the catch, thereby allowing the latching mechanism to be canted to cause the hook element to become free of the catch and thereby to allow the bar and attached lid to be pivoted upwardly to a position allowing access to the interior of the cooker pot. This opposite direction displacement of the spindle cannot occur while pressure conditions exist within the cooker pot due to the engagement of the pin of the safety lock with any one of the slots of the sleeve element, the sleeve element only allowing tightening of the latching mechanism and not release thereof while pressure conditions exist within the cooker pot.

Accordingly, it is a primary object of the present invention to provide a simple, safe and easily operated latching locking mechanism for operating a lid of a pressure vessel such as a pressure frier, the present mechanism being resistant to wear and being capable of operation by a single individual with a minimum of physical effort and which prevents opening of a pressure vessel when hazardous pressure conditions are present within a pressure frier or other pressure vessel.

It is another object of the invention to provide a latching mechanism for enabling the tightening of a lid over the opening of a pot of a pressure cooker to facilitate sealing of the lid over the pot.

Further objects and advantages of the invention will become more readily apparent in light of the following detailed description of the preferred embodiments.

BREIF DESCRIPTION OF THE DRAWINGS

FIG. 1 is a side elevational view of the latching and locking mechanisms of the invention; and FIG. 2 is a section taken along lines 2—2. of FIG. 1.

DESCRIPTION OF THE PREFERRED EMBODIMENTS

The respective disclosures of U.S. Pat. No. 4,485,936 issued to Warren A. Pardo et al and U.S. Pat. No. 4,498,695 issued to Warren A. Pardo are incorporated hereinto by reference. The structures of these patents can be used in association with the structure disclosed herein in whole or in part. In particular, the latching mechanism described herein includes structure which facilitates tightening of a lid over a frying pot, this tightening structure being useful with a safety lock such as that described in either of the aforementioned patents including a pressure-operated locking mechanism 32 of U.S. Pat. No. 4,498,695 or the solenoid locking mechanism of U.S. Pat. No. 4,485,936.

Referring now to the drawings, a pressure cooker is seen generally at 10, the pressure cooker including a frying pot 12 which is mounted on a cabinet (not shown) which also houses conventional mechanisms such as oil filtration apparatus, control apparatus, and the like in a well known fashion. The frying pot 12 is covered by a lid 14 which is sealed against peripheral edges of the frying pot 12 which define the opening closed by the lid 14. A bar 16 is pivotally mounted to a rear exterior wall of the frying pot 12 in a conventional manner whereby a force is exerted upwardly on the bar 16 to cause upwardly pivoting movement of the bar and thus opening of the lid 14 on release of restraints to opening of the lid provided by the latching mechanism shown generally at 18.

The bar 16 is pivotally mounted to the lid 14 in a manner such as is particularly described in U.S. Pat. No. 4,498,695. As described therein, the force necessary to maintain the lid 14 over the frying pot 12 is effectively exerted at pivotal connection 20 between the lid 14 and bar 16, this force being exerted evenly over the lid 14 to more effectively seal the lid to the pot 12. Although a force acting on the lid 14 is effectively exerted centrally thereof, the force has its genesis at distal end 22 of the bar 16 and is produced by operation of the latching mechanism 18 which functions to provide the force necessary to seal the lid 14 to the frying pot 12 and to positively latch the bar 16 in a position which maintains the lid 14 in sealed relation over the opening of the frying pot 12. A locking mechanism 24 acts in concert with the latching mechanism 18 to prevent opening of the lid 14 when hazardous pressure conditions exist within the frying pot 12. The locking mechanism 24 can be operated by pressure communicated thereto from the interior of the frying pot 12, preferably through a steam line 26 such as is described in U.S. Pat. No. 4,498,695. Alternatively, the safety interlock system described in U.S. Pat. No. 4,485,936 which employs a pressure-operated locking mechanism can be utilized.

Considering now the functioning of the latching mechanism 18, it is to be noted that the latching mechanism 18 is substantially configured as shown in U.S. Pat. No. 4,498,695 to include a spindle 28 having a hook 30 disposed at its lower end and which engages a catch 32 located on an exterior wall of the frying pot 12 to latch the lid 14 to the pot 12 on tightening of the latching mechanism 18.

The upper end of the spindle 28 mounts a hub assembly 34 having radial arms 36 terminating in round knobs 38. The hub assembly 34 rotates on a threaded upper portion (not shown) of the spindle 28 as is described in U.S. Pat. No. 4,498,695 to allow operation of the latching mechanism 18. The hub assembly 34 can be held on the spindle by means of a retainer element 40, the retaining element functioning simply to prevent inadvertent removal of the hub assembly 34 from the spindle 28.

The hub assembly 34 comprises an upper hub sleeve 42 and a slotted sleeve element 44. The hub sleeve 42 and the sleeve element 44 can be integrally formed. The upper hub sleeve 42 primarily functions to mount the radial arms 36. The slotted sleeve element 44 can also be seen in FIG. 2 to be provided with a plurality of slots 46 disposed about the outer surface of the sleeve element 44, the slots 46 being preferably disposed regularly thereabout. The slots 46 are each seen to be defined by an abutment 48 on one side, and a sloping surface 50 which extends from the lowermost portion of the abutment 48 in an arcuate fashion to the uppermost portion of the adjacent slot. Accordingly, the slotted sleeve element 44 essentially takes the form of a "ratchet wheel". A locking pin 52 extends from the locking mechanism 24 and can be held in proximity to the latching mechanism 18 by a mount 54 as shown in the unlocked condition of FIG. 1, the locking pin 52 does not engage any of the slots 46. However, on advent of pressure conditions within the frying pot 12, the locking mechanism 24 is activated to cause the locking pin 52 to extend toward the latching mechanism 18 and to engage one of the slots 46 and to be disposed against the abutment 48 of said slot 46.

After engagement of the locking pin 52 with the slotted sleeve element 44, it is sometimes desirable to further tighten the lid 14 over the frying pot 12. Accordingly, an operator grasps the radial arms 36 and round knobs 38 of the hub assembly 34 and rotates the hub assembly 34 in a clockwise direction as seen in FIG. 2 to cause the locking pin 52 to ride over the sloping surface 50 and then engage the adjacent slot 46. The latching mechanism 18 can thus be operated to cause tightening of the lid 14 to the frying pot 12 as desired. An adjustment mechanism 56 carried by the spindle 28 between the hook 30 and the connection of the spindle 28 to the bar 16 functions in the manner described in U.S. Pat. No. 4,498,695 to prevent over tightening of the lid to the frying pot 12. The adjustment mechanism 56 can take a variety of forms or, if desired, can be omitted.

The cooperative action of the locking pin 52 of the locking mechanism 24 and the slotted sleeve element 44 of the latching mechanism 18 acts to prevent counter clockwise or "release" rotation of the hub assembly 34 while pressure conditions exist within the frying pot 12. When pressure conditions no longer exist within the frying pot 12, the locking pin 52 is disengaged from one of the slots 46 and the hub assembly 34 is then allowed to rotate in a counter clockwise direction to unlatch the latching mechanism 18 and to allow opening of the lid 14. The end of the locking pin 52 can be shaped to facilitate engagement within the slots 46 and travel over the sloping surfaces 50. In essence, the locking pin 52 can be "straight sided" at the portion thereof which contacts the abutments 48 of the slots 46 and can be rounded at 58 to facilitate slotting contact between the locking pin 52 and the sloping surfaces 50 of the slots 46. Operation of the latching mechanism 18 and the cooperative relationship between the latching mechanism 18 and the locking mechanism 24 is fully described in U.S. Pat. No. 4,498,695 and reference is made thereto. The slotted sleeve element 44 which acts in concert with the locking pin 52 facilitates tightening of the lid 14 to the frying pot 12 after establishment of pressure conditions within the frying pot 12.

The latching mechanism 18 and the locking mechanism 24 are thus seen to provide simple, inexpensive and wear-resistant structure capable of effective and safe operation to latch, seal and lock a lid 14 over the opening of a frying pot 12 such as is commonly employed in a pressure cooker 10. While the invention has been described in relation to the particular embodiment shown, that is, relative to a use to maintain a lid on a pressure cooker, it is to be understood that the invention can be configured otherwise and as explicitly shown and described herein without departing from the intended scope of the invention and that the structure of the invention can be utilized in use environments other than explicitly shown. In particular, the structure of the present invention can also find utility in pressure vessels generally to secure a lid or hatch cover over an associated opening. Accordingly, the scope of the invention is seen to be defined by the recitations of the appended claims.

What is claimed is:

1. Apparatus for securing a lid of a pressure vessel over an opening thereof, the pressure vessel having a catch located on the body of the vessel, comprising:

a bar pivotally connected at a first end to the vessel and engaging the lid at a location along the length of the bar;

latching means carried on a second, free end of the bar for biasing the bar against the lid to force the lid into a secured position over the opening of the vessel, a portion of the latching means engaging the catch on the body of the vessel for latching the bar and associated lid over the opening, the latching means further comprising an elongated spindle carried in and extending through a recess in the free end of the bar, the spindle terminating at one end in a hook element constituting the aforesaid portion of the latching means which is adapted to engage the catch on the body of the vessel, the other end of the spindle having a threaded portion, and, a hub having a threaded bore extending therethrough and matingly receiving at least a portion of the threaded portion of the spindle therewithin, the hub being rotatable to cause the spindle to be displaced longitudinally within the threaded bore by virtue of the action of the mating threads of the bore and spindle, thereby to displace the hook element relative to the catch to latch or unlatch the bar and associated lid over the opening of the vessel;

a hub element carried by the hub and having a plurality of slots disposed therein, the slots facing outwardly of the hub element and each slot being defined by an abutment surface and a sloping surface extending from an innermost edge of the abutment surface to an outermost edge of an adjacent slot;

locking means carried by the bar and disposed adjacent to the hub for inhibiting the rotation of the hub in a direction which would open the lid during the existence of hazardous pressure conditions within the pressure vessel, the locking means comprising a pin mounted for horizontal movement to engage a distal end of the pin within one of the slots to inhibit rotation of the hub, and, pressure exerting means engaging an anterior end of the pin for exerting pressure on the pin to displace said pin into engagement with the hub element, the pressure exerting means being responsive to pressure conditions existing within the pressure vessel, the hub being rotatable to tighten the latching means after engagement of the pin within one of the slots, the distal end of the pin riding over the sloping surface of one of the slots to be displaced from said slot on tightening rotation of the hub and to engage the adjacent slot in the direction of tightening and to contact the abutment surface of said adjacent slot; and, means connected to the safety interlock means for operating the safety interlock means.

2. The apparatus of claim 1 wherein the pressure exerting means comprise as a solenoid, a pressure switch for actuating the solenoid on attainment of predetermined pressure conditions within the pressure vessel to cause the pin to engage one of the slots in the hub element, and means for communicating the pressure within the pressure vessel to the pressure switch.

3. The apparatus of claim 2 wherein the solenoid is a pull-type DC linear solenoid having a spring return which biases the pin into engagement with one of the slots in the hub element on discontinuation of power to the solenoid and wherein the pressure switch comprises means for discontinuing power to the solenoid on attainment of predetermined pressure conditions within the pressure vessel.

4. The apparatus of claim 1 wherein the slots are regularly spaced about the hub element.

5. The apparatus of claim 1 wherein the distal tip of the pin is shaped to facilitate movement of said pin over the sloping surfaces of the slots.

6. Apparatus for securing a lid of a pressure vessel over an opening thereof, the pressure vessel having a catch located on the body of the vessel, comprising:

a bar pivotally connected at a first end to the vessel and engaging the lid at a location along the length of the bar;

latching means carried on a second, free end of the bar for biasing the bar against the lid to force the lid into a secured position over the opening of the vessel, the latching means comprising an elongated spindle mounted at the free end of the bar, the spindle terminating at one end in a hook element which engages the catch on the body of the vessel for latching the bar and associated lid over the opening, and a hub carried by the spindle at the other end of said spindle, and cooperating means formed on the spindle and on the hub for displacing the spindle relative to the hub on rotation of the hub to displace the hook element relative to the catch, thereby to latch or unlatch the bar and associated lid over the opening of the vessel;

a hub element carried by the hub and having a plurality of slots disposed therein, the slots facing outwardly of the hub element and each slot being defined by an abutment surface and a sloping surface extending from an innermost edge of the abutment surface to an outermost edge of an adjacent slot;

locking means carried by the pressure vessel and disposed adjacent to the hub for inhibiting the rotation of the hub in a direction allowing opening of the lid during the existence of hazardous pressure conditions within the pressure vessel, the locking means comprising a pin mounted for horizontal movement to engage a distal end of the pin within one of the slots to inhibit rotation of the hub, and means engaging an anterior end of the pin for exerting pressure on the pin to displace said pin into engagement with the hub, the pressure exerting means being responsive to pressure conditions existing within the pressure vessel, the hub being rotatable to tighten the latching means after engagement of the pin within one of the slots, the distal end of the pin riding over the sloping surface of one of the slots to be displaced from said slot on tightening rotation of the hub and to engage the adjacent slot in the direction of tightening and to contact the abutment surface of said adjacent slot.

7. The apparatus of claim 6 wherein the distal end of the pin is shaped to facilitate contact of one side of the pin with an abutment surface and rounded at the distal tip of the pin to facilitate moving contact between the distal end of the pin and a sloping surface of any one of the slots.

8. The apparatus of claim 6 wherein the slots are regularly disposed about the hub element.

9. The apparatus of claim 6 and further comprising means associated with the locking means to exert a force on the pin to bias the pin away from engagement with the hub on release of pressure exerted on the pin by the pressure exerting means.

10. The apparatus of claim 6 and further comprising retaining means disposed on the end of the spindle for retaining the hub on the spindle.

* * * * *